United States Patent
McCarthy et al.

[11] Patent Number: 5,356,187
[45] Date of Patent: Oct. 18, 1994

[54] RECOVERY AND DEPLOYMENT DEVICE

[75] Inventors: James M. McCarthy, Mattapoisett, Mass.; Earl S. Nickerson, Jr., Little Compton, R.I.

[73] Assignee: The United States of America as represented by the Secretary of the Navy, Washington, D.C.

[21] Appl. No.: 79,518

[22] Filed: Jun. 21, 1993

[51] Int. Cl.$^5$ .............................................. B66C 1/42
[52] U.S. Cl. .................. 294/99.1; 294/66.1; 294/86.4; 294/111
[58] Field of Search ............... 294/66.1, 86.3, 99.1, 294/100, 111; 901/21, 31, 36; 623/64; 414/7

[56] References Cited

U.S. PATENT DOCUMENTS

| | | | |
|---|---|---|---|
| 889,699 | 6/1908 | Lipscomb | 294/111 X |
| 2,545,452 | 3/1951 | Fletcher | 623/64 |
| 3,866,966 | 2/1975 | Skinner, II | 623/64 X |
| 4,592,581 | 6/1986 | Howard et al. | 294/86.4 X |
| 4,850,631 | 7/1989 | Dotsko | 294/86.4 |
| 5,080,682 | 1/1992 | Schectman | 623/64 |
| 5,200,679 | 4/1993 | Graham | 294/111 X |

FOREIGN PATENT DOCUMENTS

| | | | |
|---|---|---|---|
| 724337 | 3/1980 | U.S.S.R. | 294/111 |
| 910410 | 3/1982 | U.S.S.R. | 294/111 |
| 1211203 | 2/1986 | U.S.S.R. | 294/111 |
| 1474068 | 4/1989 | U.S.S.R. | 294/111 |

*Primary Examiner*—Dean J. Kramer
*Attorney, Agent, or Firm*—Michael J. McGowan; Prithvi C. Lall; Michael F. Oglo

[57] ABSTRACT

A recovery and deployment device consists of a relatively small base and a plurality of cable controlled armatures extending therefrom in substantially the same direction. Drive cables operate on the armatures for driving the end portions toward either an open or closed position. Each armature includes an elongated tentacle having a first end fixed to the support base and a terminating head portion. Inbound and outbound guides are provided for assisting in moving the free ends of the tentacles either inwardly or outwardly relative to their rest position. The armatures are arranged on the base in a petal-like interleaved array that permits interference-free overlapping of adjacent armatures upon closing movement out of the rest position, as well as movement of the free ends of each tentacle outwardly relative to the rest position so as to provide an enlarged target zone for recovering an object.

11 Claims, 5 Drawing Sheets

RECOVERY AND DEPLOYMENT DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to a recovery and deployment device and is more particularly concerned with a new and improved device of the type described having a plurality of armatures adapted to easily and quickly grasp various objects and gently and firmly hold those objects prior to release and deployment thereof.

(2) Description of Prior Art

Recovery and deployment devices utilized heretofore have typically employed rigid mechanical clamping mechanisms capable of gripping or grasping objects of various shapes and sizes. These devices are frequently cumbersome and bulky, requiring many parts and computer feedback to determine if there is appropriate force to grasp the objects. Additionally, since the mechanical clamping devices are typically not self-centering, it is necessary that the device be positioned precisely over the object to be grasped. Further, if the clamping force is not precise, the objects being grasped can be scratched or damaged during either the recovery or deployment sequence. Due to the bulky nature of these mechanisms, it also is particularly difficult to utilize them in small areas that have limited access.

Rigid, basket-like arrays of tubes in the form of a cage also have been employed, particularly from helicopters, where large, bulky or cumbersome retrieval devices are not a disadvantage. However, even these devices typically are not self-centering and tend to scratch or damage the object being retrieved or deployed.

The Howard et al U.S. Pat. No. 4,592,581 describes a remotely controlled gripping mechanism comprising a plurality of tubular gripper arms, the free ends of which can be drawn together by a contained continuous loop of a snare line to capture the object. The snare line is fixedly attached to a support plate while a parallel thrust plate mounts the tubular arms. A bellows mechanism between the two plates operates to separate the support and thrust plates causing the snare line to draw the distal ends of the tubes together to retainably capture an object.

The Dotsko U.S. Pat. No. 4,850,631 employs a triangular array of coil springs that are controlled by cords extending through the coils to move the ends of the springs toward a closed position. The single control cord for each spring is attached to a specific portion of the spring, spaced from the axis thereof, so that tension applied to the cord will cause movement of the distal end of the springs toward the center of the triangular array.

In both of the foregoing devices, the grasping elements moved between a rest position and a closed position, with the rest position being synonymous with a fully open position, thereby limiting the size of the object that may be recovered or deployed.

SUMMARY OF THE INVENTION

The device of the present invention is a simple, lightweight flexible mechanism readily adapted to easily and quickly grasp much larger objects and to firmly but gently hold those objects without damaging or scratching the object. The device advantageously provides an equalizing force on each armature to provide self-centering, thereby obviating the need for precise positioning of the device relative to the object to be recovered. The simple interleafed construction of the device makes it particularly well adapted for use in small areas that are difficult to access, while permitting the device to conform to the object being recovered. This is achieved through a smoothly operating adjustable and cushioned armature profile that does not require computer feedback and can be adjusted to provide a significantly enhanced recovery zone coupled with a soft, yet very strong grasp of the object being recovered or deployed.

Other features and advantages of the invention will be in part obvious and in part pointed out more in detail hereinafter.

These and related advantages are achieved in accordance with the present invention by providing a recovery and deployment device having a relatively small base and a plurality of armatures operatively secured to the base and extending therefrom in substantially the same direction toward cooperative terminating end portions. The armatures are spaced from an axial center line extending through the base in substantially the same direction as the armatures. Drive means operate on the armatures for driving the end portions toward an open or closed position. Each armature includes an elongated tentacle having a first end fixed to the support base in spaced relationship to the axial center line of the base and a free terminating end opposite the fixed first end. The terminating end is movable either inwardly or outwardly from a rest position. The base is provided with an inbound guide and an outbound guide for assisting in moving the free ends of the tentacles either inwardly or outwardly relative to their rest position. A closing drive member secured to the free end of each armature and associated with the inbound guide is effective for driving the free end of each tentacle out of a rest position toward its closed position, while an opening drive member for each tentacle is associated with the outbound guide and is effective for providing expanding movement of the free ends of the tentacles from the rest position.

In a preferred embodiment, the armatures are arranged on the base in a petal-like interleaved array that permits interference-free overlapping of adjacent armatures upon closing movement out of the rest position, as well as movement of the free ends of each tentacle outwardly relative to the rest position so as to provide an enlarged target zone for recovering an object.

The invention accordingly consists in the features of construction, combination of elements and arrangement of parts which will be exemplified in the construction hereafter set forth. A better understanding of this invention will be obtained from the following description and accompanying drawing of an illustrative application of the invention.

DESCRIPTION OF A PREFERRED EMBODIMENT

Figure 3:
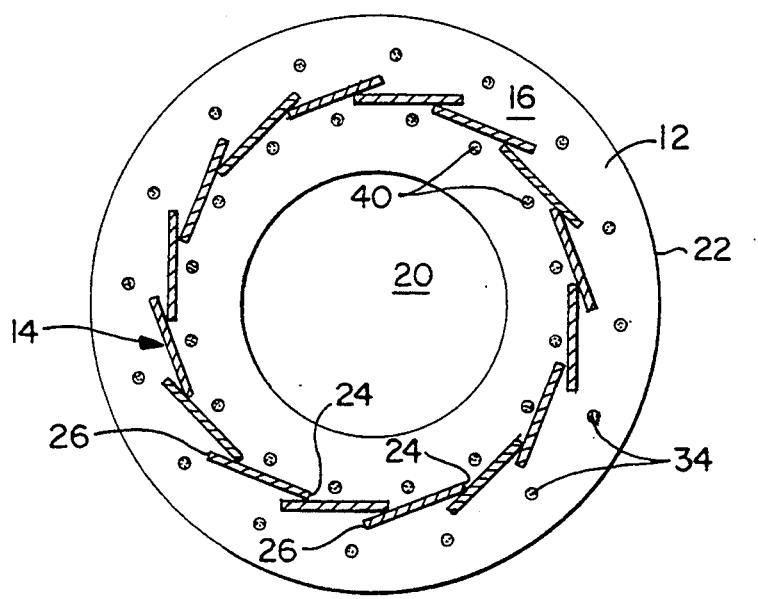
FIG. 3 is an enlarged sectional view taken along the line 3—3 of FIG. 1.
Figure 1:
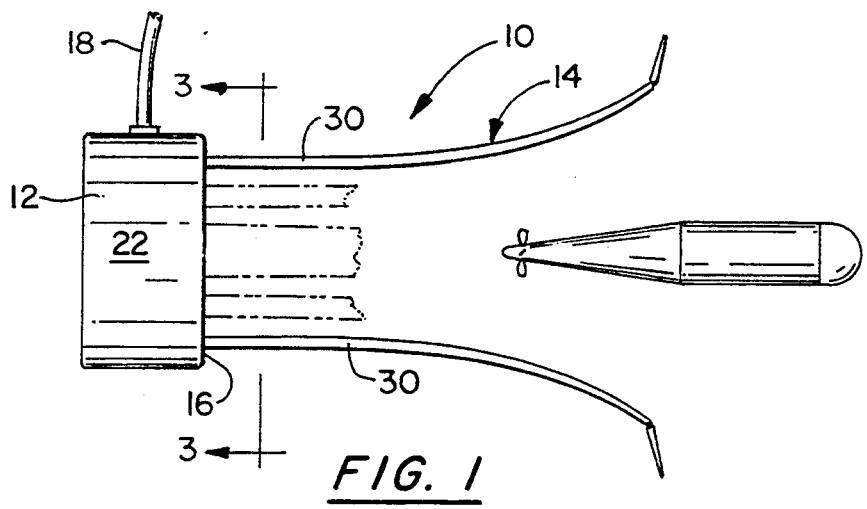
FIG. 1 is a side elevational view, partially in phantom for ease of understanding, of a recovery and deployment device embodying the features of the present invention, the device being shown in a partially open mode.
Figure 2:
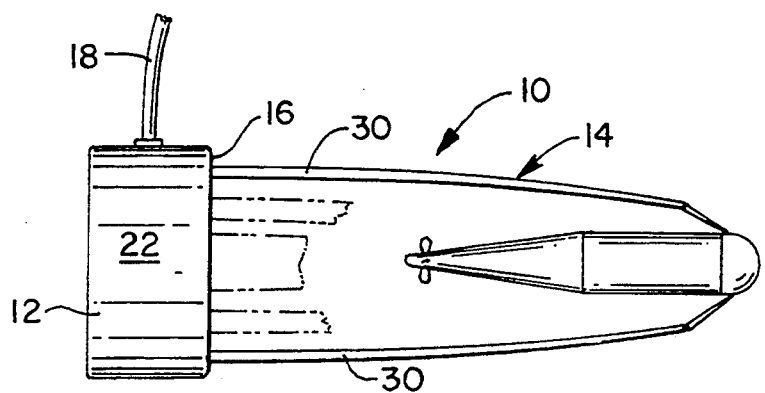
FIG. 2 is view similar to FIG. 1 with the device shown in an object-retaining closed mode.
Figure 6:
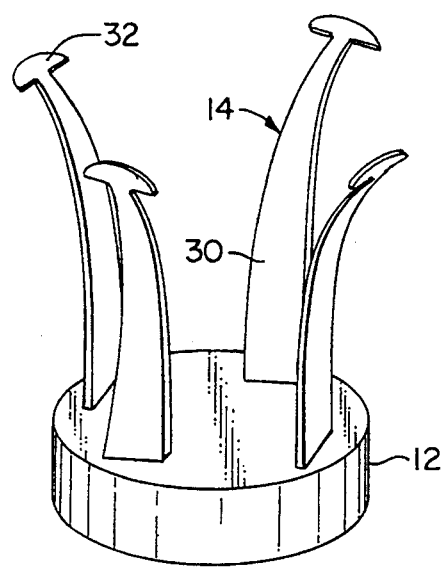
Figure 7:
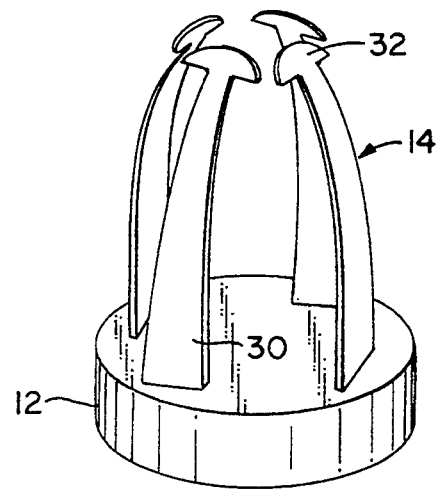

Referring now to the drawings in greater detail wherein like reference numerals indicate like parts throughout the several figures, the recovery and deployment device 10 of the present invention is shown as consisting of a disc-like base 12 with a plurality of elongated armatures 14 operatively secured to and extending outwardly from one side face 16 thereof. The device may be suspended by suitable means not shown to retrieve or deploy a particular object under water, on land or above the land. The base 12 is provided with an appropriate control line 18 and not only securely anchors each of the armatures 14, but also provides an appropriate housing for the tension inducing drive mechanism operative for moving the armatures out of their rest position, either toward a fully open position, see FIGS. 1 and 6, or toward a fully closed position, as illustrated in FIGS. 2 and 7. The support base 12 may assume the configuration of a ring-like structure, as shown in FIG. 3, having a central aperture 20 extending axially therethrough. The plurality of armatures 14 secured to the base ring are arrayed in a circular configuration midway between the outer periphery 22 and the central aperture 20 of the base and equidistant from the axial center line extending through the base in substantially the same direction as the longitudinal dimension of the armatures. It should be noted that configurations other than a circular configuration are possible without deviating from the teachings of the subject invention.

In the specific embodiments illustrated, a large number of relatively narrow, elongated armatures 14 are shown secured to the surface 16 of the base 12 in an overlapping or interleaved configuration with one longitudinally projecting edge 24 thereof being positioned radially inwardly of the opposite longitudinal edge 26 thereof relative to the axial center line. This interleaved petal-like array not only facilitates noninterfering movement of the armatures during the opening and closing operation of the device, but also provides an appropriate orientation for each armature so as to facilitate proper opening and closing movement of the armature under the driving action of the tension drive cables secured thereto. Of course, the number and size of the armatures may vary with the size of the device.

Each armature 14 of the device consists of a relatively thin and flexible elongated tentacle portion 30 having a significantly greater width than thickness. As shown in the embodiment illustrated in FIGS. 4-8, the tentacle portion 30 of the armature may be a flat elongated slat-like member that is fixedly anchored to the base 12 and extends perpendicular thereto when in its rest position. In the specific embodiment illustrated, the tentacle portion 30 has a slightly increased thickness at the end fixed to the base 12 and narrows slightly in both thickness and width as it extends outwardly from the base. As will be appreciated, the specific shape of the tentacle portion may vary significantly so long as it exhibits the requisite flexibility and functions as the central structural member of the armature.

Integrally formed at the free end of each tentacle portion is a terminating head portion 32 of the armature 14. The head portion 32 is of substantially the same thickness as the tentacle portion 30, but abruptly increases in width to provide a suitable cable-engaging appendature or bend-inducing element. As shown, the terminal head portion 32 is accurately contoured on its extremity facing away from the base 12 and provides a limited degree of resilience relative to the axis of the tentacle portion of the armature. This permits flexure of the head portion relative to the axis of the armature and facilitates contact with and firm engagement of any irregular contour on the object being deployed or recovered. The head portion only, or the entire armature, may be provided with a cushioning or protective covering that will protect an object from any scratching or other damage as the object is grasped by the armature and may be aerodynamically altered for the environment in which it will be used.

Figure 4:
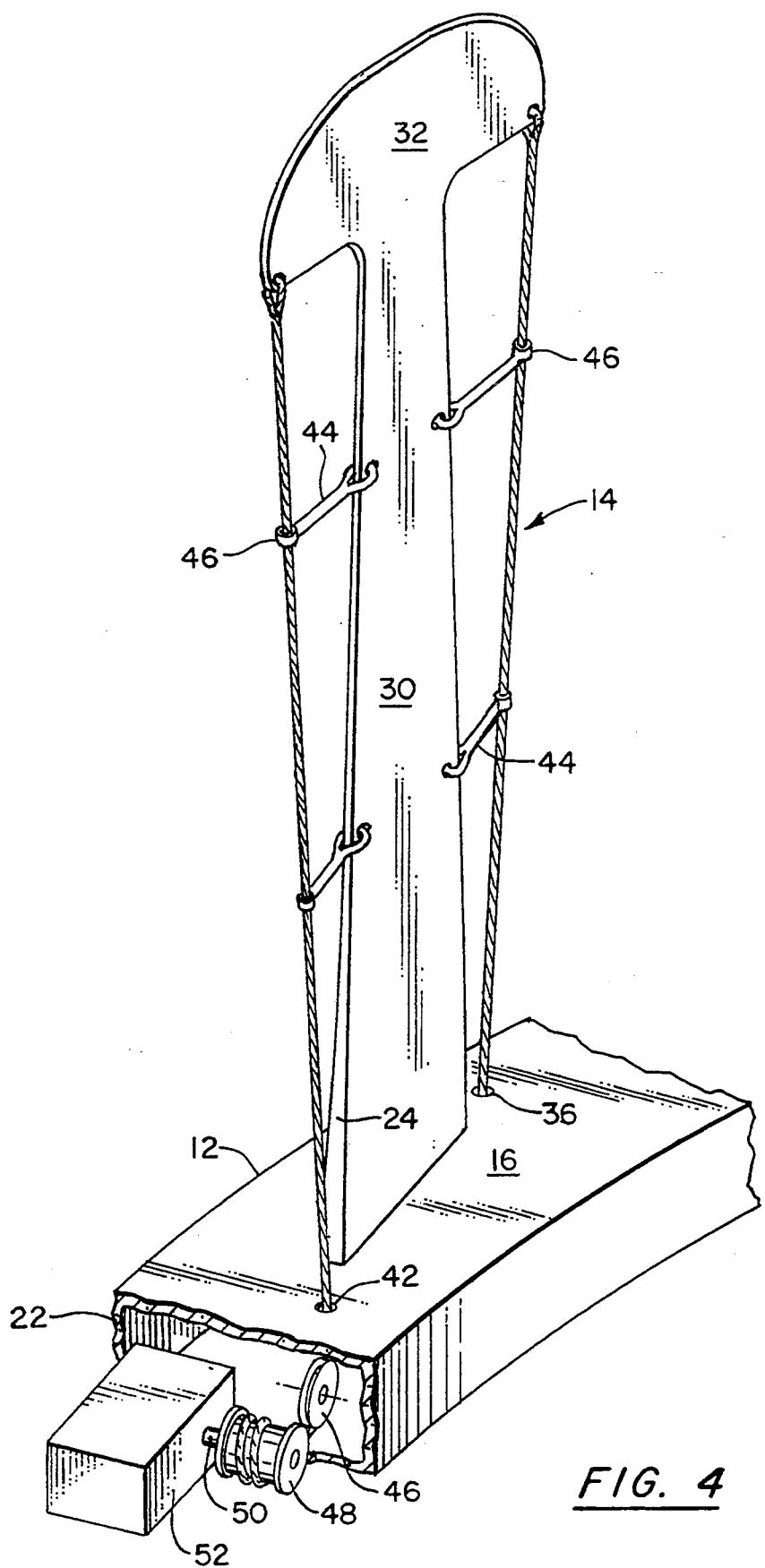
FIG. 4 is a further enlarged perspective view of one embodiment of an armature used in the device of FIG. 1 with the support base broken away to show an exemplary tension inducing mechanism.
Figure 5:
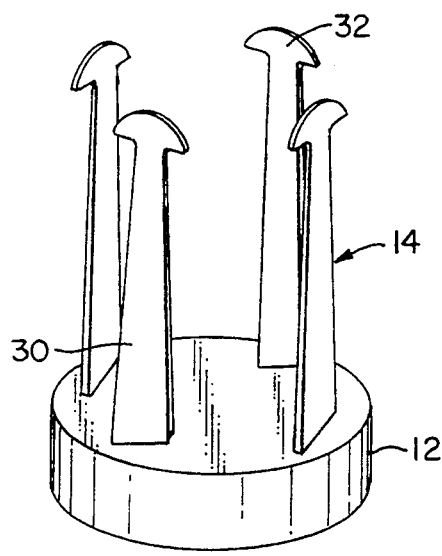
FIGS. 5-7 are schematic perspective views of an array of armatures similar to FIG. 4 in the rest, open and closed positions, respectively.
Figure 9:
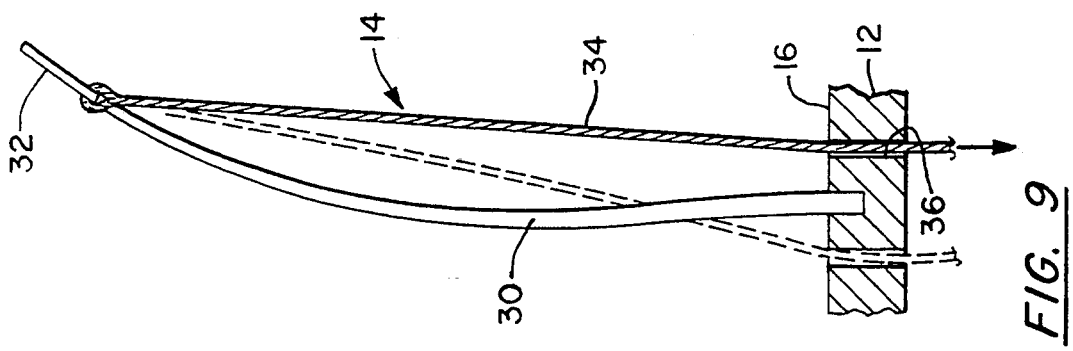
Figure 8:
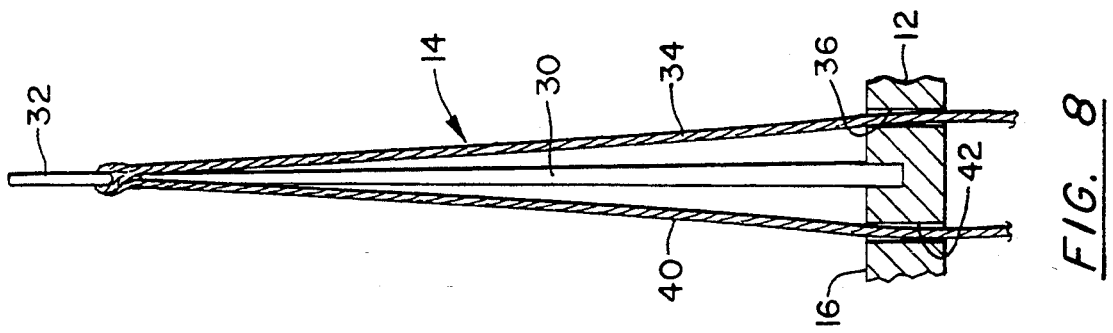

As mentioned, each armature 14 is provided with a pair of tension drive cables secured to the head portion 32 of the armature. The cables are effective for driving the armatures out of the rest position perpendicular to the base toward either an open or closed position. The outbound cable 34 is attached to the head portion 32 adjacent the edge 26 of the armature furthest from the axial center line of the base and extends through an aperture 36 in the base 12, as shown in FIGS. 4 and 8, that serves as an outbound guide. The guide 36 is positioned on the base radially outwardly of the outermost edge 26 of the armature to which it is attached so that tension on the outbound cable 34 will cause the head portion 32 and tentacle portion 30 of the armature 14 to bend radially outwardly relative to the base support 12, thereby moving the armature 14 out of its rest position schematically illustrated in FIG. 8 toward an open position, as schematically illustrated in FIG. 9.

Figure 10:
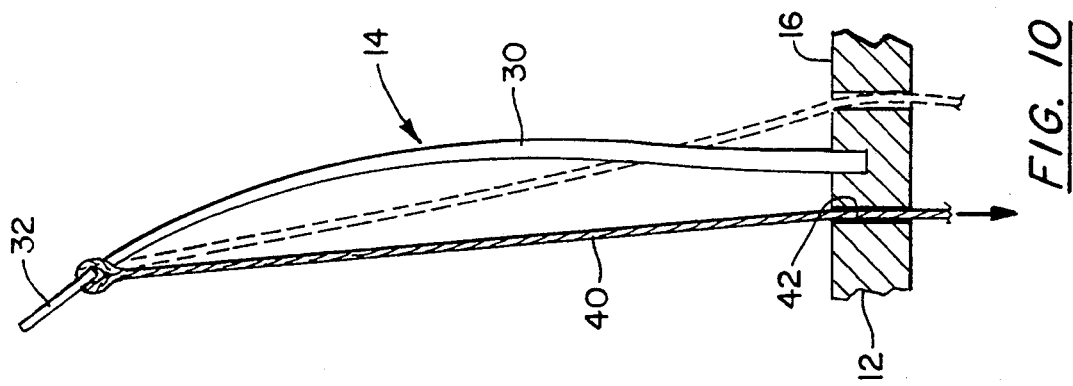
FIGS. 8-10 are elevational views, partly in section, showing the armature of FIG. 4 in its rest, partially open and partially closed positions, respectively.

Similarly, in order to close the device for grasping an object, a tension cable 40 is secured to the head portion 32 of the armature adjacent the inbound edge 24 thereof and passes through an aperture 42 positioned radially inwardly of the armature and serving as an inbound guide. Tensioning of the closing drive cable 40 will draw the head portion 32 and the tentacle portion 30 of the armature in a radially inward direction relative to the support base 12 so as to move the armature from the rest position of FIG. 8 toward a closed position, as schematically illustrated in FIG. 10. The interleaved petal-like array of the armatures provides for full noninterfering closure of the head portions against or around an object being grasped or recovered. Additionally, it provides an enlarged target zone in the open position.

In addition, a series of cable control spacers or guides 44 are spaced along the length of the tentacle portion 30 and extend laterally outwardly therefrom. The spacers may be provided with appropriate guide rings 46 for assisting in the proper positioning of the tensioning cables and to guide the cables during the tensioning thereof while avoiding any undesired entanglement.

A suitable mechanical tension-inducing device may be employed in order to subject the cables to the appropriate tensioned driving force. Thus a single tension drive may be used for all opening cables or separate coordinated drives may be used for one or more opening cables. Similar single or multiple drives may be employed for the closing cables. For example, as shown in FIG. 4, each closing tensioning cable 40 may be provided with an appropriate pulley 46 and cable accumulating drum 48 operated by a drive shaft 50 driven by a motor 52 housed in the base 12. The motor 52 can operate independently or, preferably, in synchronism with the drive mechanisms for the other closing tension cables. Preferably, the drive mechanisms for tensioning the cables are mounted in the support base, as depicted in FIG. 4, and can be easily controlled either remotely or via the support conduit 18 connected to the base.

Figure 11:
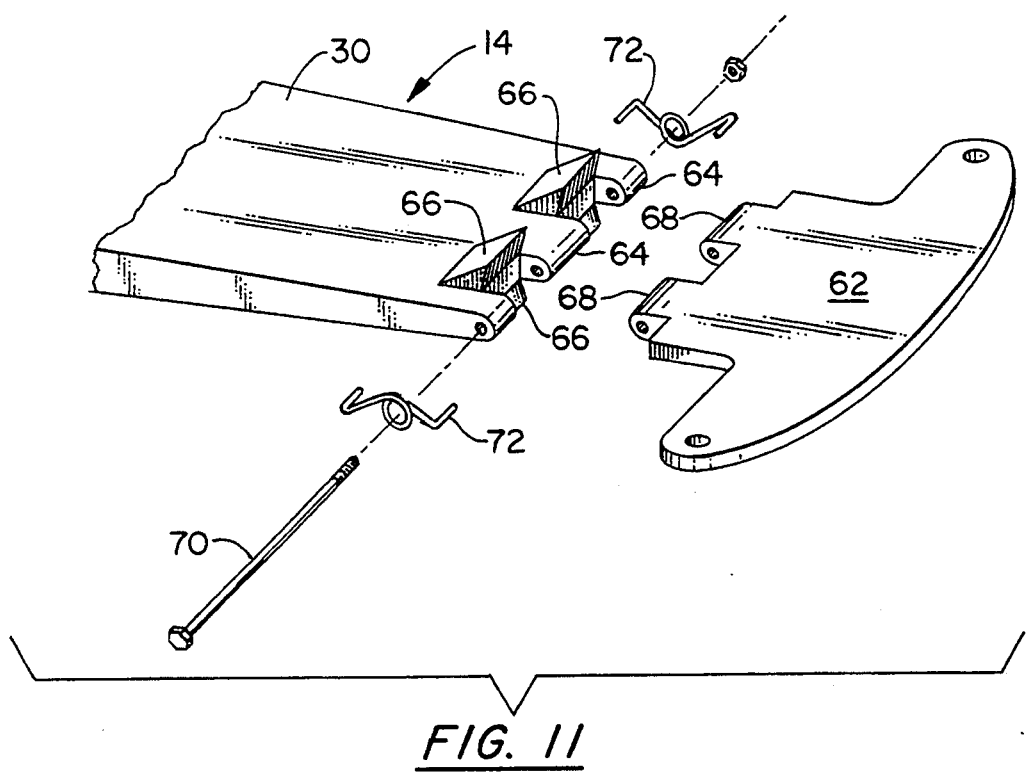
FIG. 11 is an exploded perspective view of the free end portion of another embodiment of the armature of the device of FIG. 1.
Figure 12:
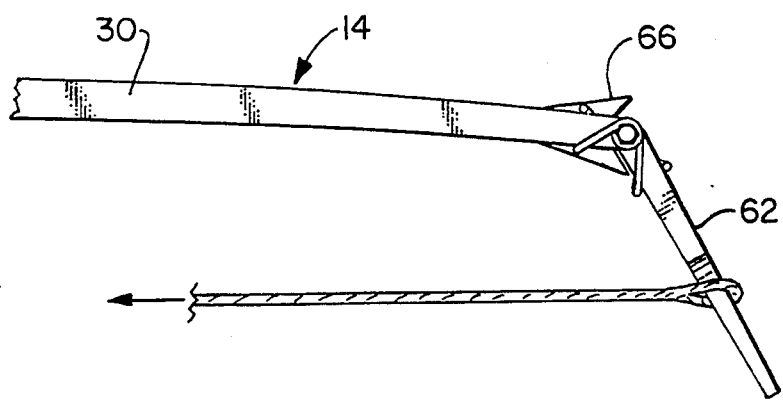
FIG. 12 is a side view of the assembled free end portion of FIG. 11 in a partially actuated position.

FIGS. 11 and 12 show an alternative embodiment for the terminal head portion of the armatures. In this embodiment, the head portion 62 is hingedly connected to the tentacle portion 30 to provide more controlled articulation of the head portion during the opening and closing operations. As shown, the free end of the tentacle portion 30 is provided with a series of spaced hinge knuckles 64 and pairs of intermediate raised stop members 66 on opposite sides of the armature. The terminal head portion 62 also is provided with hinge knuckles 68 that complement and interfit with the knuckles 64 on the tentacle portion. A hinge pin 70 extends through apertures in the respective knuckles and mounts a pair of oppositely biased spring members 72 for providing resistance against movement of the head portion 62 in opposite directions out of its rest position. Each cable can, as shown in FIG. 12, pivot the head portion 62 against the bias of a separate spring 72 until it reaches the stop 66. Further, tensioning by the cable will impart bending action by the tentacle portion 30 of the armature, which also may be hinged at intermediate locations, to drive the armature to its fully open or fully closed position.

As will be apparent to persons skilled in the art, various modifications and adaptations of the structure above described will become readily apparent without departure from the spirit and scope of the invention.

What is claimed is:

1. In a recovery and deployment device having a base, a plurality of armatures operatively secured to the base and extending therefrom in substantially the same direction toward cooperative terminating end portions, said armatures being spaced from an axial center line extending through said base in substantially said same direction, and drive means operative on said armatures for driving said end portions toward a closed position, the improvement wherein each of said armatures comprises an elongated tentacle having a first end fixed to the base in spaced relationship to said axial center line and a terminating end opposite said first end moveable into and out of a rest position, said tentacle including a resilient body portion bendable toward and away from said axial center line from said rest position and a bend-inducing portion associated with said terminating end, said resilient body portion having a natural bias toward said rest position, said base having an inbound guide and an outbound guide for each armature, said drive means being operatively secured to said terminating end and including a closing drive member for each armature associated with said inbound guide for effecting closing movement of the terminating end out of said rest position and an opening drive member for each armature associated with said outbound guide for effecting expanding movement of said terminating end out of said rest position, said drive means being operative to drive said bend-inducing portion and terminating end of said tentacle out of the rest position toward respective closed and expanded positions against the bias of said resilient body portion.

2. The device of claim 1 wherein said bend-inducing portion is hingedly connected to said resilient body portion.

3. The device of claim 1 wherein said closing drive member includes a closing tension member operatively secured to the tentacle and operatively cooperating with said inbound guide to drive said terminating end generally toward said axial center line toward a closed position, said opening drive member including an expansion tension member operatively secured to the tentacle and operatively cooperating with said outbound guide to drive said terminating end away from said axial center line toward an expanded position, said drive means including a tension-inducing drive operatively associated with said closing and expansion tension members for alternatively tensioning said tension members to drive said terminating end of said tentacle out of the rest position toward the respective closed and expanded positions.

4. The device of claim 1 wherein said closing drive member includes a closing tension cable and said opening drive member includes an expansion tension cable for alternatively driving said terminating end of said tentacle out of the rest position toward the respective closed and expanded positions.

5. The device of claim 4 wherein said armatures have spacers extending from said tentacles to both said closing and expansion tension cables to assist said inbound and outbound guides and avoid entanglement of said cables during tensioning thereof.

6. The device of claim 1 wherein said inbound guide includes a first aperture in said base, said first aperture being closer to said axial center line than the first end of said tentacle, and said outbound guide includes a second aperture in said base, said second aperture being farther from said axial center line than the first end of said tentacle.

7. The device of claim 1 wherein said first end of said tentacle for each armature is substantially equidistant from said axial center line.

8. In a recovery and deployment device having a base, a plurality of armatures operatively secured to the base and extending therefrom in substantially the same direction toward cooperative terminating end portions, said armatures being spaced from an axial center line extending through said base in substantially said same direction, and drive means operative on said armatures for driving said end portions toward a closed position, the improvement wherein each of said armatures comprises an elongated tentacle having a first end fixed to the base in spaced relationship to said axial center line and a terminating end opposite said first end moveable into and out of a rest position, said armatures are arranged on said base in a petal-like array that permits interference free overlapping of adjacent armatures upon closing movement out of said rest position, said base having an inbound guide and an outbound guide for each armature, said drive means being operatively secured to said terminating end and including a closing drive member for each armature associated with said inbound guide for effecting closing movement of the terminating end out of said rest position and an opening drive member for each armature associated with said outbound guide for effecting expanding movement of said terminating end out of said rest position.

9. The device of claim 8 wherein said inbound guide includes a first aperture in said base, said first aperture being closer to said axial center line than the first end of said tentacle, said outbound guide including a second aperture in said base, said second aperture being farther to said axial center line than the first end of said tentacle, said closing drive member including a closing tension cable extending through said first aperture of said inbound guide, said expanding drive member including an expansion tension cable extending through said second aperture of said outbound guide, said drive means including a tension-inducing drive operatively associated with said closing and expansion tension cables for alternatively tensioning said cables to drive said tentacle out of the rest position toward the respective closed and expanded positions.

10. The device of claim 8 wherein said armature including a bend-inducing element operatively associated with the terminating end of the tentacle, said closing drive member including a closing tension cable fixedly secured to the bend-inducing element, said expanding drive member including an expansion tension cable fixedly secured to the bend-inducing element, said drive means including a tension-inducing drive operatively associated with said closing and expansion tension cables for alternatively tensioning said cables to drive said bend-inducing element and terminating end of said tentacle out of the rest position toward the respective closed and expanded positions, said bend-inducing element and terminating end of each of said tentacles being spaced from each other in said rest position, said armatures having spacer strips extending from said tentacles to said closing and expansion tension cables to assist said inbound and outbound guides and avoid entanglement of said cables during tensioning thereof.

11. The device of claim 10 wherein said bend-inducing portion is hingedly connected to said tentacle.

* * * * *